UNITED STATES PATENT OFFICE.

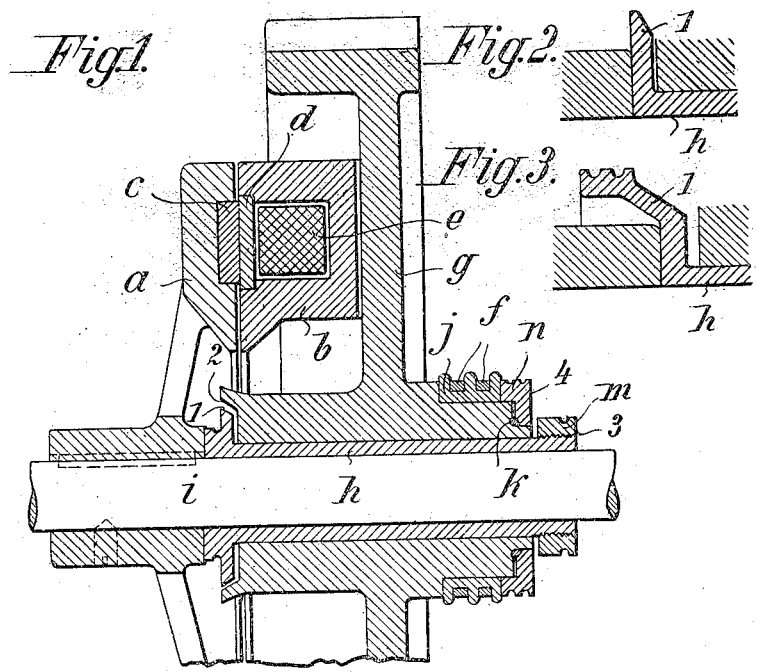
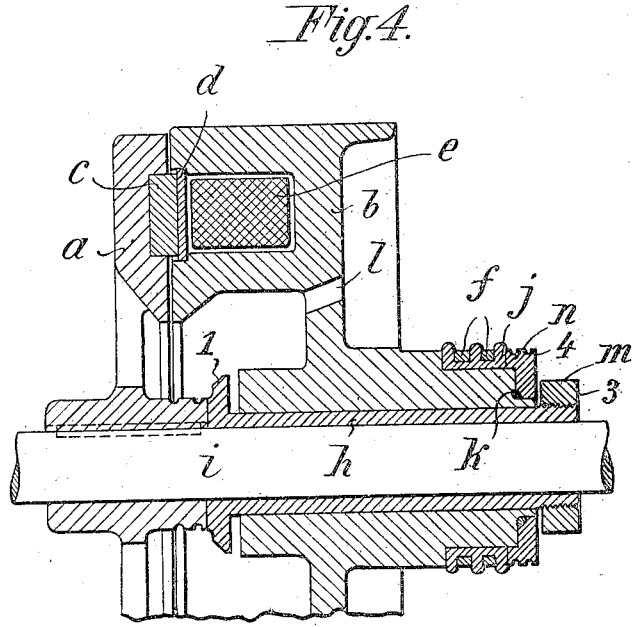

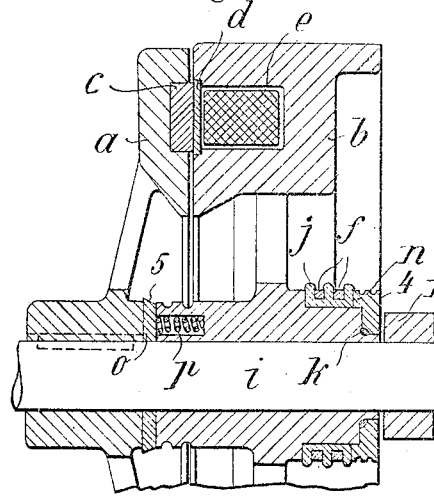
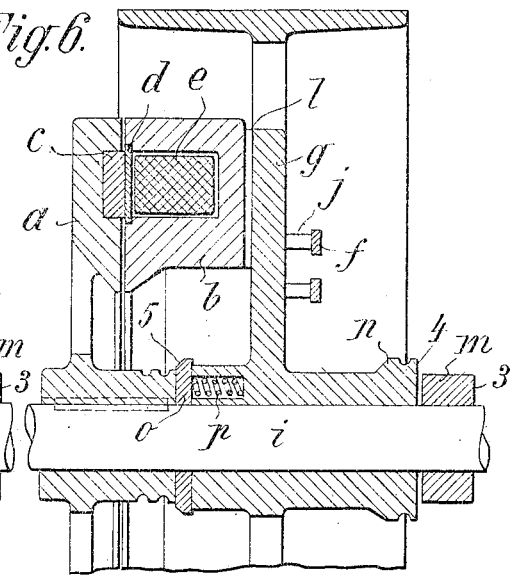
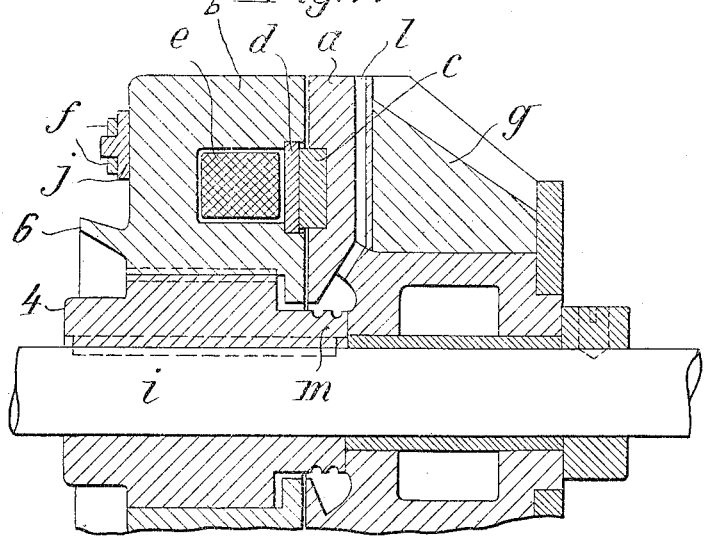

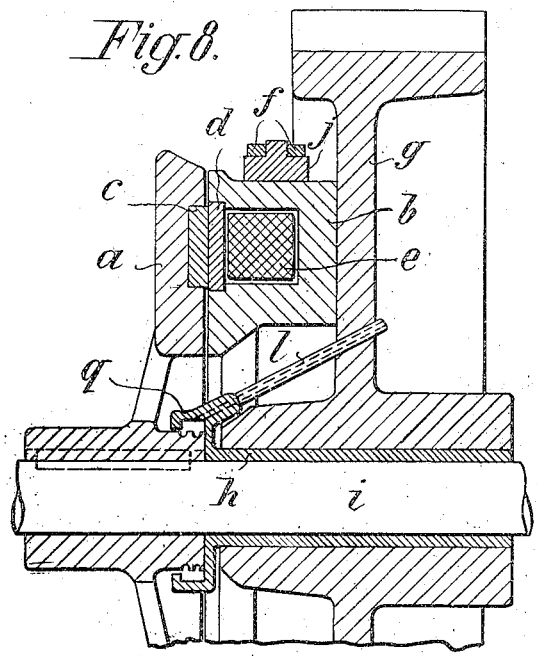
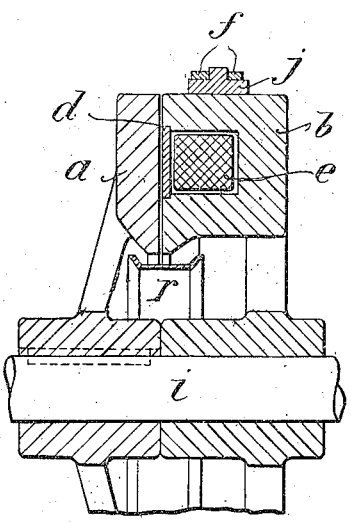
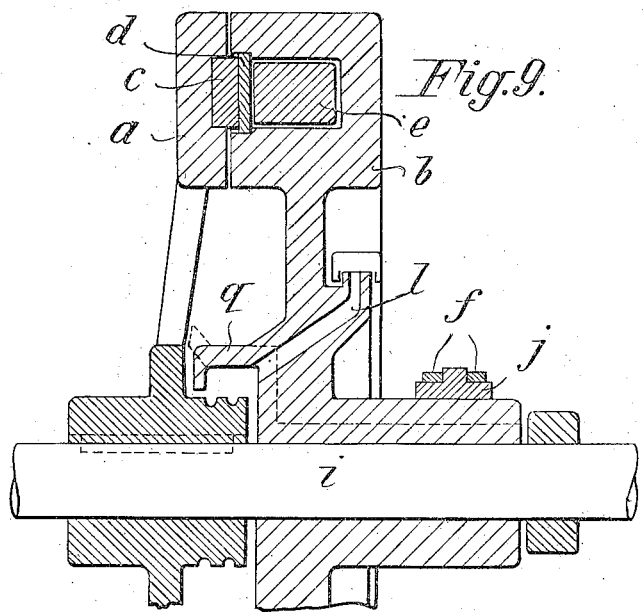

HEINRICH AST, OF VIENNA, AUSTRIA-HUNGARY, ASSIGNOR TO THE FIRM OF VULKAN MASCHINENFABRIKS-ACTIEN-GESELLSCHAFT, OF VIENNA, AUSTRIA-HUNGARY.

ELECTROMAGNETIC CLUTCH.

No. 914,375.    Specification of Letters Patent.    Patented March 9, 1909.

Application filed June 15, 1906. Serial No. 321,866.

*To all whom it may concern:*

Be it known that I, HEINRICH AST, subject of the Emperor of Austria-Hungary, residing at Vienna, Austria-Hungary, have invented certain new and useful Improvements in Electromagnetic Clutches, of which the following is a specification.

In electro-magnetic clutches breakdowns and damage are frequently caused by the lubricating medium from the lubricated parts of the clutch getting between the magnetically attracted parts of the clutch and between the friction surfaces of the clutch to the winding of the electro-magnet or to the contact rings, so that the frictional resistance necessary for the transmission of power is materially reduced. This results in the parts slipping and being irregular in their action, or in the winding and its insulation being damaged, and where lubricating medium is present on the contact rings the resistance to the electric current which effects the excitation of the magnetic parts of the clutch is altered.

The present invention has for its object to provide a device on clutches of this kind for obviating the said disadvantages and which device is broadly such that the lubricating agent is thrown by centrifugal force from the lubricated parts into chambers which are out of the reach of the parts to be protected and which chambers are provided with guiding surfaces for altering the direction of flow of the lubricating medium thrown from the lubricated parts and whereby such lubricating medium is carried off by centrifugal force.

Devices for effecting this purpose may be variously constructed; the accompanying illustrative drawings show some constructional examples.

In all the figures of such drawings the two parts of the clutch which attract each other are marked $a$ and $b$, the frictional surfaces $c$ and $d$ the winding $e$ and the contact rings $f$.

In Figure 1 there is connected to the part $b$ of the clutch a gear wheel $g$, or it might be a belt pulley, rope pulley or the like, which is mounted upon the running bush $h$ and which runs loose upon the shaft $i$ with the clutch part $b$ when this part is thrown out of operation, while the part $a$ of the clutch is keyed upon such shaft. The necessary lubrication is therefore between the shaft $i$ and the bush $h$ and, on account of the rotary movement of the part $g$ of the machine upon the bush $h$ between these two parts also. For the purpose of keeping lubricating medium, thrown out by centrifugal force from the before mentioned parts of the clutch, away from those parts likely to be injuriously affected by the lubricating medium, the inner end of the running bush $h$ is extended beyond the planes of the two attracted surfaces of the clutch parts $a$ and $b$ and beyond the planes of the friction surfaces, and the bush, as well as the hub portion of the gear wheel $g$, are provided at this part with outwardly inclined lubricant guiding surfaces 1 and 2. In this way the lubricating medium is thrown through a nozzle-like annular groove or grooves against a conical face of the part $a$ of the clutch and into a chamber located in a plane at one side of those of the attracted surfaces and the friction surfaces, contact of the lubricating medium with the friction surfaces $c$, $d$ and the winding $e$ being thereby rendered impossible. Lubricating medium emerging from the other end of the running bush $h$ is centrifugally thrown out along the surfaces 3 and 4 of the lubricant guide rings $m$ and $n$ which are at one side of the contact rings $f$, the outer periphery of such guide rings being formed with grooves, hereinafter called spurting grooves, adapted to check the flow or creep of lubricant and cause it to be thrown off so that the contact rings $f$ and their insulation $j$ are kept perfectly dry. By means of packing $k$ between the wheel hub and the lubricant guiding ring $n$ which as beforesaid is formed with lubricant spurting grooves passage of the lubricant medium into the interior of the insulation of the contact rings is prevented.

Figs. 2 and 3 illustrate other shapes of the inner end of the running bush $h$ and its lubricant deflecting surface 1.

As shown in Fig. 4 the chamber into which is led lubricating medium, thrown out from the inner end of the running bush $h$ and from the hub of the part $b$ of the clutch, may be arranged in the part $b$ of the clutch by suitably shortening these parts while still being situated in a plane at one side of those of the attracting surfaces and the friction bodies. The deflecting surface is accordingly arranged to extend in an opposite direction to that of the arrangement shown in Figs. 1 to 3. The lubricating material which collects in this chamber can pass to the outside by passages 1 in the part *b* of the clutch. It is also advisable to form the hub of the part *a* of the clutch with spurting grooves for collecting the lubricating medium falling down from the inclined surface of the collecting chamber against which it is centrifugally thrown.

In the constructions illustrated in Figs. 5 and 6, the part *b* of the clutch runs loosely without a bush upon the shaft *i*. In each of these two constructions the inner end of the hub is extended beyond the planes of the two attracting surfaces, a guiding or deflecting surface *v* of an intermediate ring *o* being inclined outwardly or inwardly to one side or the other according to the position of the chamber into which the lubricating medium is discharged. The hub of the part *b* of the clutch, or of the part *g* of the machine, contains springs *p* which act upon the intermediate ring *o*, and the other hub which is juxtaposed to the ring *o* having a lubricant guiding or deflecting surface 5, has spurting grooves formed in its outer periphery. Passages 1 (Fig. 6) may be provided for carrying away the lubricating medium from the receiving chamber. The contact rings *f* and their insulation *j* are protected from the lubricating medium thrown centrifugally off from the lubricant guiding surface 4 in consequence of the lateral arrangement of such surfaces.

In the clutch shown in Fig. 7 that end of the hub of the part *b* of the clutch which is formed with spurting grooves projects into a chamber in the part *a* of the clutch arranged in a plane at one side of the planes of the attracting surfaces, passages 1 being provided to carry off the lubricating medium to the outside from such chamber. The contact rings *f*, which are connected to but insulated from the part *b* of the clutch, are protected by the outwardly turned lubricant guiding or deflecting surface 4 and by a suitably shaped annular flange 6.

In the construction shown in Figs. 8 and 9, the chamber into which is centrifugally thrown the lubricating medium emerging from between the shaft *i* and running bush *h* and from between the shaft *i* and hub of the clutch part *b*, is formed by a channel-shaped flange *q* on the running bush and on the hub of the part *b* of the clutch, respectively. This flange extends over the spurting grooves in the hub of the part *a* of the clutch, and the lubricating medium, which by these means is kept off the attracting surfaces of the clutch, and is carried off to the outside by laterally directed passages 1. The contact rings *f* may, in such a case, as shown in Fig. 8, be arranged quite out of the reach of the thrown off lubricating medium.

Fig. 10 shows a construction, in which the chamber into which the lubricating medium is thrown and thereby kept away from the attracting surfaces, the friction surfaces and the winding, is formed by a ring *r* which surrounds the part where the two hubs meet and so protects the attracting surfaces of the parts *a* and *b* of the clutch, the edge portions of the ring *r* being turned obliquely upward, in order to guide lubricating medium thrown against the ring outwardly on both sides, out of the reach of the parts to be protected. The contact rings may, in this case also be arranged outside the reach of the lubricating medium thrown off from the outer front face of the hub.

The lubricating medium thrown off can in all cases be collected in suitably arranged reservoirs.

Claims.

1. In electro-magnetic friction clutches: a shaft; a running bush; a hub thereon; and means on said bush and hub adapted to guide or deflect the lubricant in a direction to avoid the parts likely to be injuriously affected by the lubricant.

2. In electro-magnetic friction clutches; a shaft; a running bush; and a hub thereon, said bush and hub being provided with outwardly inclined guiding surfaces for the lubricant.

3. In electro-magnetic friction clutches: a shaft; a running bush; and a hub thereon, the inner end of said bush and hub extending beyond the planes of the two attracting surfaces and the two friction surfaces of the clutch, and each having outwardly inclined guiding surfaces for the lubricant.

4. In electro-magnetic friction clutches: a shaft; a hub thereon; and lubricant guide rings provided with spurting grooves, on said hub.

5. In electro-magnetic friction clutches: a shaft; a running bush; a hub thereon; and lubricant guide rings provided with spurting grooves, on said running bush and hub.

In testimony whereof I have hereunto set my hand in presence of two subscribing witnesses.

HEINRICH AST.

Witnesses:
 JOSEF RUBRESCH,
 ALVESTO S. HOGUE.